(12) United States Patent
Templeton et al.

(10) Patent No.: US 7,430,537 B2
(45) Date of Patent: Sep. 30, 2008

(54) SYSTEM AND METHOD FOR VERIFYING A FINANCIAL INSTRUMENT

(75) Inventors: James E. Templeton, San Jose, CA (US); Sanjay Bhargava, San Carlos, CA (US)

(73) Assignee: PayPal, Inc., San Jose, CA (US)

( * ) Notice: Subject to any disclaimer, the term of this patent is extended or adjusted under 35 U.S.C. 154(b) by 836 days.

(21) Appl. No.: 09/901,954

(22) Filed: Jul. 10, 2001
(Under 37 CFR 1.47)

(65) Prior Publication Data
US 2002/0004772 A1   Jan. 10, 2002

(51) Int. Cl.
*G06Q 40/00*   (2006.01)

(52) U.S. Cl. ............................. 705/39; 705/26; 705/27; 705/37; 705/38; 705/40; 705/41; 705/42; 705/53; 705/64; 705/75

(58) Field of Classification Search .................. 705/38, 705/40, 41, 42, 53, 64, 75, 26, 27, 37
See application file for complete search history.

(56) References Cited

U.S. PATENT DOCUMENTS

| | | | |
|---|---|---|---|
| 3,823,308 A | 7/1974 | Goldberg | |
| 3,852,571 A | 12/1974 | Hall | |
| 3,896,266 A | 7/1975 | Waterbury | |
| 4,471,216 A | 9/1984 | Herve | |
| 5,053,606 A | 10/1991 | Kimizu | |
| 5,416,306 A | 5/1995 | Imahata | |
| 5,532,464 A | 7/1996 | Josephson | |
| 5,679,938 A | 10/1997 | Templeton | |
| 5,708,422 A * | 1/1998 | Blonder et al. ............. | 340/5.41 |
| 5,750,972 A | 5/1998 | Botvin | |
| 5,770,843 A | 6/1998 | Rose | |
| 5,778,178 A | 7/1998 | Arunachalam | |

(Continued)

FOREIGN PATENT DOCUMENTS

AU   199928111 B2   1/2000

(Continued)

OTHER PUBLICATIONS

Horne, D. Doak, Letter from Gowling Lafleur Henderson LLP to Park, Vaughan & Fleming LLP, Jul. 21, 2004.

(Continued)

*Primary Examiner*—Nga B. Nguyen
(74) *Attorney, Agent, or Firm*—Schwegman, Lundberg & Woessner, P.A.

(57) ABSTRACT

A system and method for verifying a financial instrument or a user's authorization to use a financial instrument. The system initiates one or more verifying transactions involving the instrument, with details that may vary from one transaction to another, such as the type of transaction (e.g., deposit, credit, debit), amount of the transaction, number of transactions, the merchant or vendor name or account for the transaction, and so on. Selected details, particularly variable ones are saved in the system. The user accesses information regarding the transaction, by accessing it on-line, via telephone, in a monthly statement, etc. The user then submits the requested details to the system, which compares them to the stored details. If they correspond, then the user may be allowed to use the instrument (e.g., for a purchase, a fund transfer).

43 Claims, 2 Drawing Sheets

U.S. PATENT DOCUMENTS

| | | | |
|---|---|---|---|
| 5,793,028 A | | 8/1998 | Wagener |
| 5,870,456 A | | 2/1999 | Rogers |
| 5,883,810 A | | 3/1999 | Franklin |
| 5,903,878 A | * | 5/1999 | Talati et al. .................. 705/26 |
| 5,907,801 A | | 5/1999 | Albert |
| 5,907,832 A | | 5/1999 | Pieterse |
| 5,963,917 A | | 10/1999 | Ogram |
| 5,987,500 A | | 11/1999 | Arunachalam |
| 6,029,150 A | | 2/2000 | Kravitz |
| 6,052,675 A | * | 4/2000 | Checchio .................. 705/44 |
| 6,212,556 B1 | | 4/2001 | Arunachalam |
| 6,226,624 B1 | * | 5/2001 | Watson et al. ............... 705/44 |
| 6,497,359 B1 | | 12/2002 | Chihara |
| 2002/0077837 A1 | | 6/2002 | Krueger et al. |

FOREIGN PATENT DOCUMENTS

| | | |
|---|---|---|
| AU | 200197079 B2 | 6/2002 |
| DE | 44 25 271 A1 | 1/1996 |
| DE | 196 28 045 A1 | 1/1998 |
| DE | 196 34 418 A1 | 3/1998 |
| DE | 100 22 973 A1 | 2/2001 |
| DE | 199 26 472 | 11/2001 |
| EP | 0 216 521 B1 | 4/1987 |
| EP | 0 400 911 B1 | 12/1990 |
| EP | 0 519 843 A3 | 12/1992 |
| EP | 0 527 639 A2 | 2/1993 |
| EP | 0 848 360 A1 | 6/1998 |
| WO | WO 95 06294 | 3/1995 |
| WO | WO 95 16971 | 6/1995 |
| WO | WO97/13228 A1 | 4/1997 |
| WO | WO 99/08242 | 2/1999 |
| WO | WO 99/23622 A1 | 5/1999 |
| WO | 99/66436 A1 | 12/1999 |

OTHER PUBLICATIONS

Oregon Department of Revenue, "ACH Debit Electronic Funds Transfer: Program Guide", Feb. 1999, www.dor.state.or.us/19Forms/206-029.pdf.

Automated Clearing House Rules, "A Complete Guide to Rules & Regulations Governing the ACH Network", 1999, pp. OR 4, OR 10, OG 19, OG 46-48, The National Automated Clearing House Association, Herndon, VA.

Automated Clearing House Rules, "A Complete Guide to Rules & Regulations Governing the ACH Network", 1999, The National Automated Clearing House Association, Herdon, VA.

Telstra Corporation Limited, "Statement of Grounds of Opposition and Particulars Relating to Each Ground," In the Matter of Opposition to Australian Patent Application No. 2001271968 in the name of PayPal, Inc., dated Sep. 17, 2007.

* cited by examiner

SYSTEM AND METHOD FOR VERIFYING A FINANCIAL INSTRUMENT

BACKGROUND

This invention relates to the fields of computer systems and data communications. More particularly, a system and method are provided for verifying financial instruments or accounts, such as credit cards, debit cards, bank accounts, etc.

Modern financial systems make it easy to perform financial transactions without using physical currency. For example, credit cards and ACH (Automated Clearing House) transactions (i.e., electronic checks) are increasingly used in place of cash to make purchases, transfer money, or engage in other financial transactions.

These convenient instruments are, however, subject to theft and fraudulent use. A thief may obtain all the information needed to use a stolen credit card from the card itself, while all that is needed to conduct an ACH transaction (e.g., to withdraw money from a checking account) are the bank account and routing numbers from a check. It is then a simple matter for the thief or fraud artist to pose as the rightful owner or holder of a credit card or bank account. Existing safeguards against fraud (e.g., checking a credit card against a list of stolen cards, checking the name on a checking account before completing an ACH transaction) are often insufficient. It is typically the merchant, vendor, bank or other entity that accepts a credit card or electronic check transaction that is liable for the amount of money that is stolen or misappropriated if the rightful owner or holder is not at fault.

SUMMARY

Therefore, in one embodiment of the invention a system and method are provided for verifying financial instruments or accounts, such as credit or debit cards, bank accounts, and so on, in order to ensure that a person attempting to use such an instrument is authorized to do so.

When a customer or user expresses a desire to use a certain instrument (e.g., to make purchases or fund transfers), the system initiates one or more verifying transactions using the instrument. Selected details of the transaction(s) are saved, particularly details that may vary from one transaction to another. Such variable details may include the number of transactions performed, the amount of a transaction, the type of transaction (e.g., credit, debit, deposit, withdrawal), the merchant name or account used by the system for the transaction, etc.

The user then retrieves evidence of the transaction(s) from his or her financial institution, which may be accomplished on-line, by telephone, in a monthly statement, etc., and submits the requested details to the system. The submitted details are compared to the stored details and, if they match, the user is then allowed to use the instrument. If the verification fails, the user may be allowed to try again, offer different or additional verification, his or her account may be restricted, etc.

DETAILED DESCRIPTION

Figure 1:
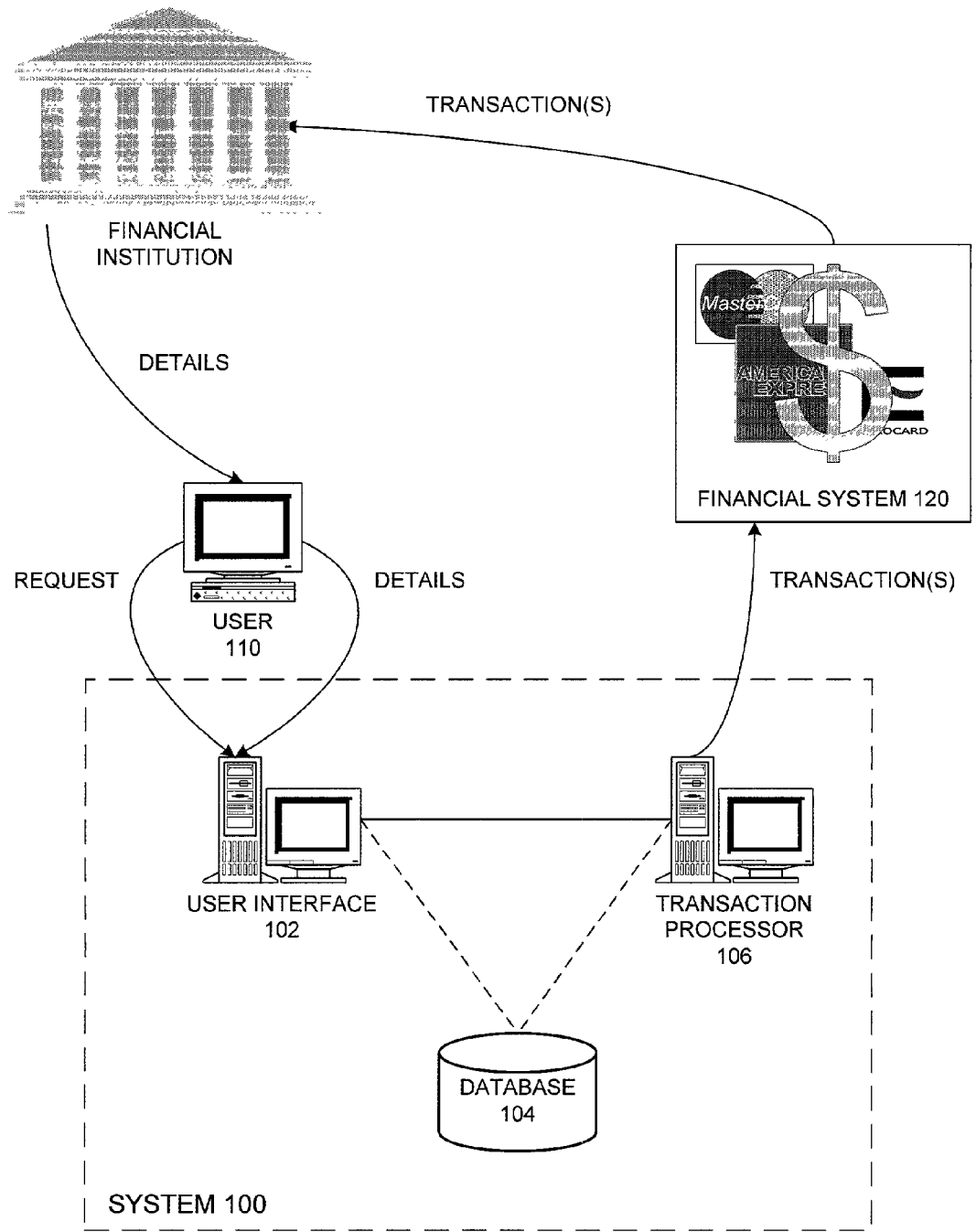
FIG. 1 is a block diagram of a system for verifying a potential user's authorization to use a financial instrument, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network or a publicly accessible network such as the Internet.

In one embodiment of the invention, a system and method are provided for verifying a financial instrument or account or verifying a user's authorization to use a financial instrument or account. A financial instrument or account may be defined to include credit cards, debit cards, bank accounts, brokerage accounts, money market accounts, and so on—virtually any entity that may be used as a source or destination of electronically exchanged value.

More particularly, a system and method of the invention may be applied to ensure that a financial instrument identified by a user (e.g., as a source of funds) is actually owned or controlled by the user. The likelihood or risk that the user has stolen the instrument, and is now attempting to use it fraudulently, may therefore be determined to be lower than if the verification was not performed.

In an embodiment of the invention, a series of transactions are performed using the instrument identified by the user. The transactions may include debits or credits to a credit card, deposits or withdrawals from a bank account, etc. Certain details of the transactions are recorded (e.g., amount, type of transaction, merchant identity, date or time of a transaction) and the user is invited to retrieve specified details (e.g., from an account statement, by calling the holder or issuer of the instrument) and identify them to the system. If the user correctly identifies the specified details, the verification process is successful. If the user is unsuccessful, he or she may be given a limited number of additional opportunities to input the correct details and, if still unsuccessful, may be barred from using the instrument. In this embodiment, the user is required to pass his or her financial institution's own verification/authentication process in order to obtain the necessary details of the transactions, thereby making it even less likely that he or she is a fraudulent user.

An embodiment of the invention may be used or applied for various reasons or in various situations. For example, a merchant may initiate or implement a verification process when a customer wishes to make a purchase (e.g., if the customer is new or if the cost of the purchase is relatively large). The customer may be able to rapidly retrieve the necessary details of the verification transactions by accessing them on-line (e.g., through a web site of her credit card issuer or bank) or by telephone.

Another embodiment of the invention may be applied to prospectively verify a user's authority to use a financial instrument. For example, an on-line system may allow users to make fund transfers and/or purchases on-line. A user may identify a financial instrument that he would like to use but the on-line system may require the financial instrument, or the user's authorization to use the instrument, to be verified before allowing the user to use it in the system.

FIG. 1 depicts a system for verifying a user's control of or authorization to use a financial instrument, according to one embodiment of the invention. In this embodiment, system 100 includes user interface 102, database 104 and transaction processor 106. User interface 102 may operate on a web server, application server, data server or other computing device. In an alternative embodiment of the invention a user may interact with the system via a human agent or representative of the system, an interactive voice recorder or other means, in addition to or instead of user interface 102. Database 104 may be separate from or integrated with user interface 102 or the computer system on which the user interface executes. Transaction processor 106 may be configured for initiating transactions for one or more different types of financial instruments or, alternatively, system 100 may include multiple transaction processors, in which case the capabilities of each may or may not overlap.

User interface 102 is configured to receive user connections, such as from user 110, and may operate differently (e.g., display different web pages, forms or menus) depending on a user's status. For example, for a connection from a new user, interface 102 may present the user with a registration form, information about services offered by the system (e.g., electronic commerce, fund transfers), etc. A registration form may require the user to identify one or more financial instruments, any of which may then be verified according to an embodiment of the invention. For registered or other experienced users, interface 102 may present customized pages or displays, electronic commerce opportunities, etc. Such a user may be invited to identify a financial instrument or account for immediate or future use as a source or destination of funds. User interface 102 may be configured to accept connections via publicly available networks (e.g., the Internet), private networks and other dedicated or shared links, which may be wired or wireless.

Transaction processor 106 is coupled to one or more financial systems or entities for processing financial transactions. Thus, financial system 120 may comprise an ACH (Automated Clearing House) vendor (e.g., a Treasury Management Service configured to handle ACH transactions such as electronic checks and deposits), a merchant acquirer or Treasury Management Service that handles credit card and/or debit card transactions, or some other entity. As specified above, system 100 may include multiple transaction processors. Each transaction processor may be configured for a different type of financial instrument and may interact with a different financial system or entity. Transaction processor 106 may be a separate or specialized element of system 100 (e.g., a computer server) or may be incorporated into another element of the system (e.g., a data server, web server).

Financial system 120 is coupled to the user's financial institution corresponding to the financial instrument being verified. Financial institution 130 may therefore be the user's bank, credit card issuer, brokerage, investment manager, etc. Financial system 120 may, in an embodiment of the invention, represent a collection of financial institutions and entities that communicate with each other by specified formats (e.g., for credit card, debit card and/or ACH transactions). Thus, financial system 120 may comprise financial institution 130.

In one method of verifying a user's financial instrument or account through system 100, user 110 connects to system 100 and identifies an instrument or account that he or she would like to use (e.g., as a source of funds for purchases or money transfers). User interface 102, or the server operating the user interface, passes the identifying information to transaction processor 106. Transaction processor 106 initiates one or more transactions, using variable details such as an amount of the transaction, type of transaction (e.g., deposit, withdrawal, debit, credit), different vendor names or identities, or other details that may be reported to or retrieved by a valid user or owner of the instrument. The transaction may be generated or constructed by user interface 102, transaction processor 106 or some other entity within system 100 (e.g., an application or data server). The generating entity also saves selected details of the transaction(s) to database 104.

Transaction processor 106 then initiates the series of transactions through appropriate financial systems or entities (e.g., financial system 120), which execute the transaction(s) in conjunction with the user's financial institution 130. Thus, the transaction processor takes information regarding the transactions(s), changes it into a form that financial system 120 can understand or use, and then interacts with or otherwise passes it to the financial system.

User 110 obtains details of the transaction(s) from a statement from institution 130, from an on-line system provided by the institution, by calling the institution, etc. User 110 then re-connects to system 100 (e.g., through user interface 102) and provides the requested details. The system compares the details provided by user 110 with the stored details and, if they match, authorizes or allows the user to use the instrument or take other desired action that may otherwise be prevented or denied. A more comprehensive method of the invention is described below in conjunction with FIG. 2.

One result of implementing an embodiment of the invention may be to reduce fraud rates, charge-backs, rejections, etc., in order to reduce the cost of business for merchants and other entities. A merchant that accepts credit cards, debit cards, electronic checks or other instruments that can be verified through a method of the invention may perform such verification for all users, just for users deemed high risk, or for some other group of users. For example, if the merchant calculates or otherwise obtains a level of risk presented by a user, that level may determine whether the user presents a low enough risk that verification is unnecessary, high enough to warrant verification, or so high that the user should be rejected without even attempting to verify the user's selected instrument.

Because the identity of a vendor (e.g., merchant) involved in a financial transaction is typically reported to a user, the specific vendor account or name used to perform a verifying transaction may be one of the details required of a user in order to verify a financial instrument. Thus, the entity (e.g., merchant, vendor, on-line service) performing or implementing a method of the invention may establish a number of vendor accounts with its merchant acquirer, credit card issuer or the bank or other institution through which it will initiate ACH and/or other transactions. Alternatively, instead of requiring separate accounts, the entity's bank, merchant acquirer or other financial system partner may allow the entity to specify a merchant name, account, or other detail to be part of the transaction.

Advantageously, the use of variable or different merchant names facilitates the use of an embodiment of the invention internationally. In particular, even if the verifying transactions are initiated in one currency and, at the user's end are converted into another currency, the merchant name or other variable identity can still be used as a verifying detail.

If the manner in which verification transactions are handled causes some of the transaction information to be truncated or excised, the verification system (e.g., system 100 of FIG. 1) may structure transactions accordingly or take that handling into account when comparing stored transaction details against the details offered by a user. For example, if it is likely that part of a vendor name or account will be truncated, then that portion of a transaction may be reported in a way that prevents truncation of disambiguating information (e.g., by using a vendor name of "2468AcmeCorporation" instead of "AcmeCorporation2468"). Then, as long as the user can provide the "2468Acme" portion, this may be considered to match the account name.

Figure 2:
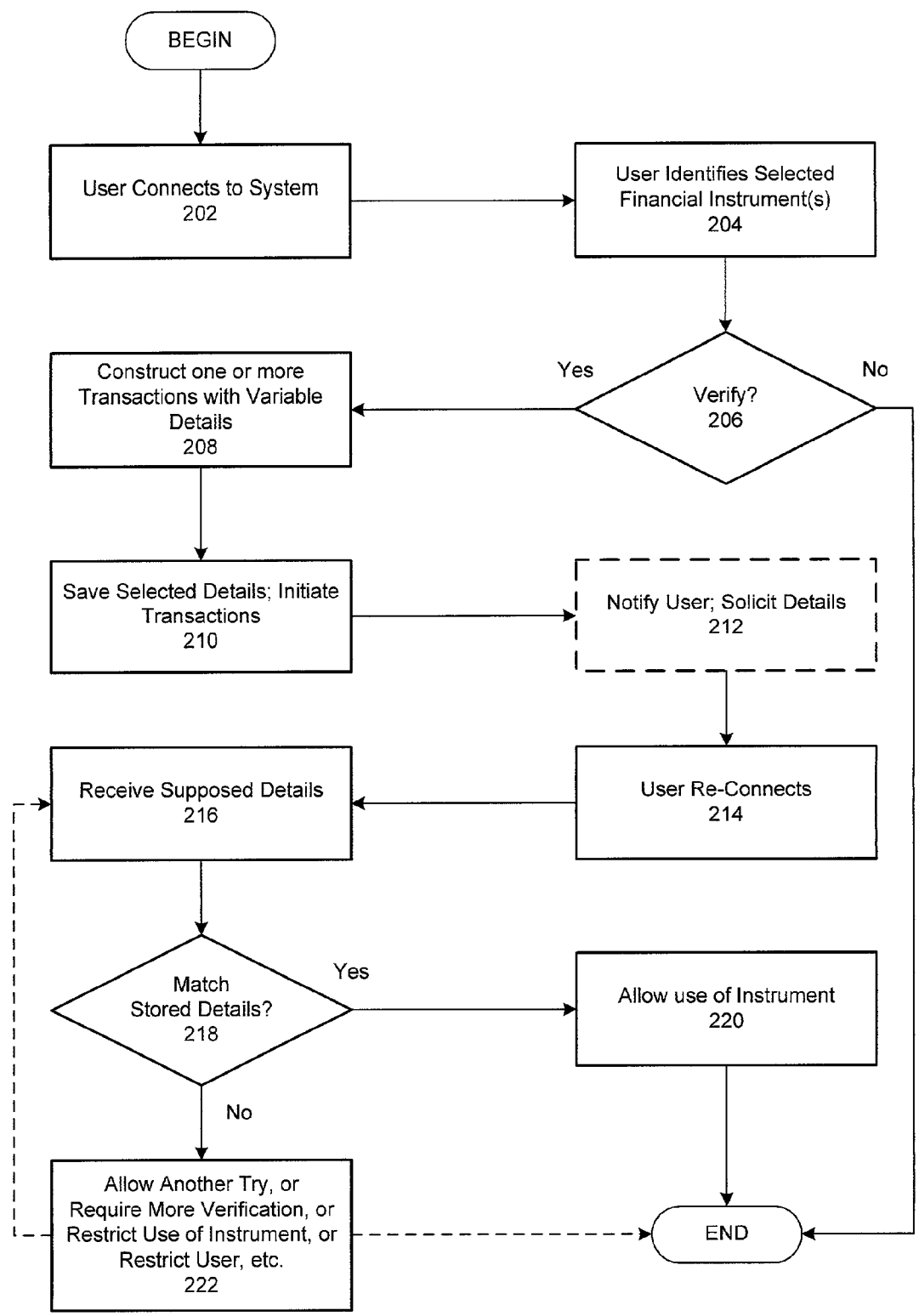
FIG. 2 is a flowchart illustrating one method of verifying a person's authorization to use a financial instrument, in accordance with an embodiment of the invention.

FIG. 2 demonstrates one method of verifying a user's specified financial instrument or verifying the user's authority to use the instrument, according to one embodiment of the invention. In this embodiment, a user selects a credit card, debit card, bank account or other account that offers electronic checking or deposits, to be the source of funds for purchases, money transfers or other transactions at a merchant (or other entity).

In order to use variable or different merchant or vendor names/accounts for verifying transactions (as described above), the merchant may, prior to the illustrated method, establish multiple accounts with its credit card issuer or ACH vendor.

In state 202 of the method of FIG. 2, a user (or a user's agent) connects to the verification system, which may be implemented as part of an on-line or traditional merchant or, another entity that accepts payment in forms other than physical currency. This connection may be the user's initial contact with the system, in which case he or she may (or may be required to) verify a source of funds as part of a registration process. Or, this may be just one of many visits, but the user may be requesting a transaction (e.g., a purchase or fund transfer) that requires verification.

In state 204, the user identifies one or more financial instruments (e.g., credit cards, debit cards, bank accounts, charge cards) or other sources of funds. Such an instrument or source may not be the one that the user is attempting, or desires, to use for a particular transaction. In particular, verifying any financial instrument or source of funds associated with the user may reduce the risk that he or she is a fraudulent user. Illustratively, the user may be required to provide (where applicable) an account name or number, the name of the registered owner/user, a physical (e.g., street) address associated with the instrument or account, a telephone number, a password or PIN, etc. In this embodiment of the invention, some or all of the electronic communications involving the system that contain financial or private data may be encrypted or otherwise protected.

In state 206 the system determines whether verification is required before the user may use an identified financial instrument. This determination may be made on the basis of various risk factors and fraud profiles, which may differ in different embodiments of the invention. For example, if any of the information provided by the user does not correspond with the identified instrument, this may indicate higher risk and the need for verification. Some other risk factors may include: a recently changed address or telephone number associated with the instrument, the time of day during which the user has connected, the number or amount of transactions the user wants to perform, the user's electronic address (e.g., IP—Internet Protocol) and whether it corresponds with his or her asserted physical address, and virtually any other activity that may be indicative of a risky or fraudulent user. Illustratively, domestic (i.e., United States) credit card users may not be subjected, in one embodiment of the invention, to verification of their credit cards, whereas all international users may require verification. Similarly, all bank accounts or other sources of electronic checks or debits may be deemed to require verification. If verification is required, the illustrated method continues at state 208; otherwise, the method ends.

In state 208, the system (e.g., a user interface, web or application server, transaction processor) generates a series of one or more verifying transactions involving the identified financial instrument. Certain details may vary from one transaction to another, thereby decreasing the likelihood that the user could guess them. Illustrative variable details include the number of transactions, type of transaction (e.g., deposit or withdrawal, debit or credit), amount of the transaction, merchant name or account used in the transaction, etc.

In one embodiment of the invention, a typical series of verifying transactions may include two deposits (to a bank account) or credits (to a credit card), each of which is between $0.01 and $0.99 in value, and may involve different merchant identities (e.g., 1234XYZCorporation, 5160XYZCorporation). To decrease the cost of performing transactions in this embodiment, one or both of the deposit/credit amounts may be biased toward the lower end of the value range.

In state 210, selected details (e.g., all or a subset of the variable details) of the transactions are saved (e.g., stored in a database) and the transactions are initiated (e.g., through transaction processors coupled to the appropriate financial systems or entities). The verifying transactions may be initiated all at the same time, may be separated in time or sent through different financial systems or entities. Also, the verifying transactions may be joined with other transactions (e.g., a verifying deposit may be merged with a subscription fee being charged to the user), in which case details of the merged transactions would be saved for comparison with the details reported by the user.

In optional state 212, the user may be notified (e.g., via electronic mail) that he or she should wait for or retrieve evidence of the transactions. The user may be notified when, or shortly after, the transaction is initiated. Or, the user may be notified after enough time has passed for the transaction to be completed.

The user's evidence of the transaction(s), which should include all or a subset of the details of the transaction(s), may be in the form of a monthly statement mailed to the user from his or her financial institution. Or, the user may take a more proactive approach and access his or her instrument or account status on-line or via telephone. In some manner, the user obtains information regarding the transaction(s).

In state 214 the user (or an agent of the user) connects to the system and, in state 216, proffers or provides supposed details of the verifying transaction(s). Illustratively, the system (e.g., a user interface) may prompt the user to enter the amount of each transaction, the merchant name (or the variable part thereof), the type of transaction, and/or any other detail that was stored.

In this embodiment, the system is configured to communicate with the user through a user interface. However, in alternative embodiments the user may be able to interact with human operators for all or any part of the verification process.

In state 218 the system compares the stored details to the details proffered by the user. If they match (e.g., if the stored details include the proffered details) the illustrated method continues at state 220. Otherwise, the method proceeds to state 222.

In state 220, the system approves the user's use of the identified financial instrument, or allows some action that was previously disallowed due to questionable risk levels, and the method ends.

In state 222, verification failed, in which case the user may be allowed to re-enter supposed details (e.g., up to some maximum number of times) or may have to provide different verification (e.g., by submitting a copy of a statement regarding the instrument—such as a monthly statement from the user's financial institution). Or, the system may restart the verification process, restrict the user's activity or use of the instrument, etc. the method may therefore end or return to a previous state.

In one embodiment of the invention, if a user for whom a series of verifying transactions have been initiated does not return to the system to submit details of the transactions within a predetermined period of time (e.g., five days, two weeks, one month), he or she may be contacted (e.g., via electronic mail and/or telephone) and prompted to complete the process.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A computer-implemented method of verifying a customer's authority to use a financial instrument, the method comprising:
    initiating one or more transactions using a financial instrument identified by a customer, wherein said one or more transactions are initiated by a transaction processor through one or more financial systems coupled to the transaction processor;
    storing one or more attributes of said one or more transactions;
    receiving a set of proffered attributes via a user interface configured to exchange communications with the customer;
    comparing said proffered attributes to said stored attributes; and
    accepting use of the financial instrument by the customer for a subsequent transaction if said proffered attributes match said stored attributes.

2. The method of claim 1, further comprising after said initiating, soliciting said proffered attributes from the customer.

3. The method of claim 1, wherein said initiating comprises:
    initiating a first transaction involving the financial instrument with a first set of attributes; and
    initiating a second transaction involving the financial instrument with a second set of attributes different from said first set of attributes.

4. The method of claim 1, wherein said storing attributes comprises storing a value of a first transaction in said one or more transactions.

5. The method of claim 1, wherein said storing attributes comprises storing a merchant identity of a first transaction in said one or more transactions.

6. The method of claim 1, wherein said storing attributes comprises storing the number of said one or more transactions.

7. The method of claim 1, wherein said storing attributes comprises storing a type of one of said one or more transactions.

8. The method of claim 1, wherein said initiating comprises operating the transaction processor to electronically initiate said transactions.

9. The method of claim 8, wherein said receiving comprises electronically receiving said proffered attributes.

10. The method of claim 1, wherein the financial instrument is a credit card.

11. The method of claim 1, wherein the financial instrument is a debit card.

12. The method of claim 1, wherein the financial instrument is a bank account.

13. A computer-implemented method of verifying a user's authorization to use a financial account, comprising:
    receiving from a user information identifying a financial account;
    selecting values for a series of transactions involving the financial account;
    initiating the series of transactions using the financial account, wherein said one or more transactions are initiated by a transaction processor through one or more financial systems coupled to the transaction processor;
    storing a first set of details of said series of transactions without informing the user of the first set of details;
    receiving a test set of details from the user as evidence of the user's control of the financial account;
    comparing said test set of details to said first set of details; and
    if said first set of details corresponds to said test set of details, authorizing the user to conduct one or more subsequent transactions using the financial account.

14. The method of claim 13, farther comprising soliciting said test set of details from the user after said initiating.

15. The method of claim 13, wherein the financial account is a credit card account.

16. The method of claim 13, wherein the financial account is a debit card account.

17. The method of claim 13, wherein the financial account is a checking account.

18. The method of claim 13, wherein the financial account is a savings account.

19. The method of claim 13, wherein the financial account is a bank account.

20. The method of claim 13, wherein said first set of details includes a merchant identity of a first transaction.

21. The method of claim 13, wherein said first set of details includes said selected values.

22. The method of claim 13, wherein said first set of details includes a type of a first transaction.

23. The method of claim 13, wherein said first set of details includes the number of said transactions.

24. The method of claim 13, wherein said first set of details includes an identity of an account involved in said transactions, other than the financial account.

25. A computer-implemented method of verifying a credit card, comprising:

receiving from a user, via a user interface configured to exchange communications with users, an account number and a name identifying a credit card the user wishes to use as a source of funds;

initiating one or more transactions involving the credit card, wherein said one or more transactions are initiated by a transaction processor through one or more financial systems coupled to the transaction processor;

storing a first set of details of said transactions in a database;

prompting the user to identify details of said transactions;

after the one or more transactions are completed, receiving from the user a second set of details; and if said second set of details matches said first set of details, authorizing the user to use the credit card as a source of funds for a subsequent transaction.

26. The method of claim 25, wherein said second set of details includes an identifier of a merchant involved in one of said one or more transactions.

27. A computer-implemented method of verifying a bank account, comprising:

receiving from a user, via a user interface configured to exchange communications with users, an account number and routing number identifying a bank account the user wishes to use as a source of funds;

initiating one or more transactions involving the bank account, wherein said one or more transactions are initiated by a transaction processor through one or more financial systems coupled to the transaction processor;

storing a first set of details of said transactions in a database;

prompting the user to identify details of said transactions;

after the one or more transactions are completed, receiving from the user a second set of details; and if said second set of details matches said first set of details, authorizing the user to use the bank account as a source of funds for a subsequent transaction.

28. The method of claim 27, wherein said second set of details includes an amount of one of said one or more transactions.

29. A computer readable storage medium storing instructions that, when executed by a computer system, cause the computer system to perform a method of verifying a customer's authority to use a financial instrument, the method comprising:

initiating one or more transactions using a financial instrument identified by a customer, wherein said one or more transactions are initiated by a transaction processor through one or more financial systems coupled to the transaction processor;

storing one or more attributes of said one or more transactions;

receiving a set of proffered attributes via a user interface configured to exchange communications with the customer;

comparing said proffered attributes to said stored attributes; and accepting use of the financial instrument by the customer for a subsequent transaction if said proffered attributes match said stored attributes.

30. A system for verifying a user's authorization to use an external financial account, comprising:

a transaction processor configured to initiate one or more transactions involving an external financial account identified by a user;

a memory configured to store a first set of details of said transactions;

a user interface configured to receive a test set of details independent of any transaction involving the external financial account; and a processor configured to compare said first set of details and said test set of details after said transactions have been completed.

31. The system of claim 30, wherein said processor is further configured to authorize the user to use the external financial account if said test set of details matches a predetermined subset of said first set of details.

32. The system of claim 30, wherein said transaction processor is coupled to an ACH (Automated Clearing House) transaction handler.

33. The system of claim 30, wherein said transaction processor is coupled to a credit card service provider.

34. The system of claim 33, wherein said credit card service provider is a merchant acquirer.

35. The system of claim 33, wherein said credit card service provider is a credit card gateway provider.

36. The system of claim 30, wherein said transaction processor is configured to construct said one or more transactions prior to their initiation.

37. The system of claim 30, further comprising a computer server for operating said user interface.

38. The system of claim 37, wherein said computer server is further configured to construct said one or more transactions prior to their initiation by said transaction processor.

39. An apparatus for verifying a customer's authority to use a financial instrument, comprising:

means for receiving from a customer information identifying a financial instrument;

transaction means for initiating one or more transactions involving the financial instrument;

storage means for storing selected details of said one or more transactions, wherein said selected details are not divulged to the customer by the apparatus;

interface means for receiving a confirmation set of details independent of any transaction involving the financial instrument; and comparison means for comparing said confirmation set of details to said selected details;

wherein the customer is deemed to have the authority to use the financial instrument if said confirmation set of details corresponds to said selected details.

40. The apparatus of claim 39, further comprising prompting means for prompting the customer to provide said confirmation set of details.

41. The apparatus of claim 40, wherein said interface means comprises said prompting means.

42. The method of claim 1, wherein said accepting comprises:

receiving the subsequent transaction, the subsequent transaction identifying a destination; and transferring funds from the financial instrument to the destination.

43. The method of claim 1, wherein said accepting comprises:

receiving the subsequent transaction, the subsequent transaction identifying a source; and transferring funds to the financial instrument from the source.

* * * * *

UNITED STATES PATENT AND TRADEMARK OFFICE
CERTIFICATE OF CORRECTION

PATENT NO. : 7,430,537 B2
APPLICATION NO. : 09/901954
DATED : September 30, 2008
INVENTOR(S) : Templeton et al.

It is certified that error appears in the above-identified patent and that said Letters Patent is hereby corrected as shown below:

On Page 2, under "Other Publications", in column 2, line 10, delete "Herdon," and insert -- Herndon, --, therefor.

In column 8, line 43, in Claim 14, delete "farther" and insert -- further --, therefor.

Signed and Sealed this

Twenty-first Day of July, 2009

JOHN DOLL
*Acting Director of the United States Patent and Trademark Office*